March 4, 1969  G. F. WITTGENSTEIN  3,430,484
LAND OR UNDERWATER PIPE LINE
Original Filed Oct. 4, 1965
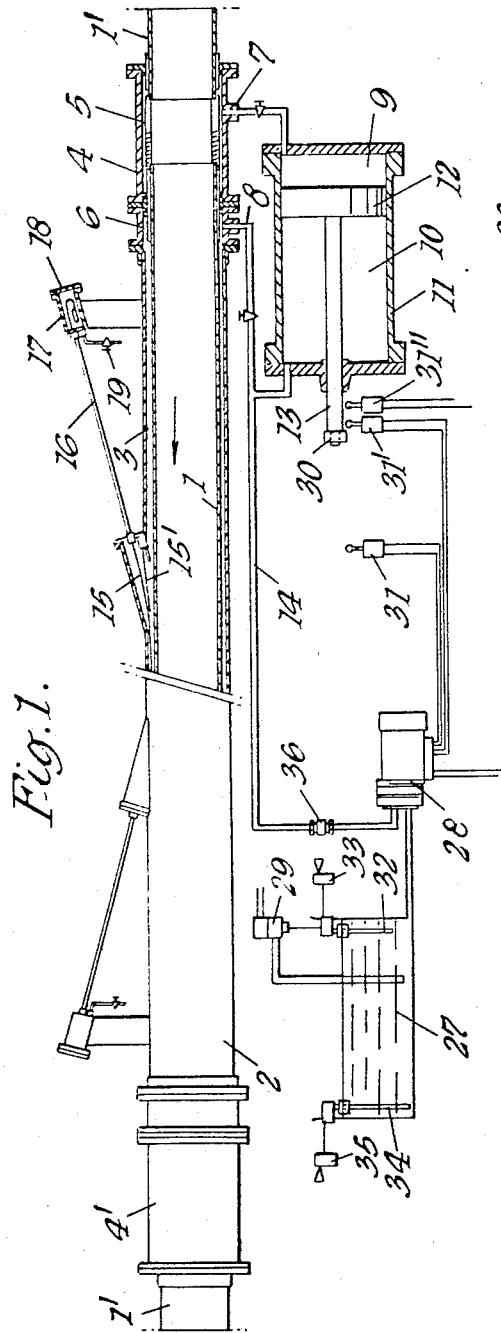

United States Patent Office 3,430,484
Patented Mar. 4, 1969

3,430,484
LAND OR UNDERWATER PIPE LINE
Gerard F. Wittgenstein, Postbox Montchoisi,
Lausanne, Switzerland
Continuation of application Ser. No. 492,417, Oct. 4,
1965. This application Aug. 8, 1967, Ser. No. 659,202
Claims priority, application Switzerland, Oct. 7, 1964,
3,892/64; Dec. 8, 1964, 15,487/64
U.S. Cl. 73—40.5                     13 Claims
Int. Cl. G01n 3/08; F16l 55/10

ABSTRACT OF THE DISCLOSURE

A pipeline of which at least a section of the conduit for the passage of a product to be transported is located in a tubular envelope with an interspace between the conduit and envelope being filled with previously chemically treated and neutralized water and connected to a water supply reservoir. An automatic pressure sensitive device for pressurizing the water relative to the pressure in the conduit is connected by means affording separate communication with the conduit and the interspace. A member integral with the pressure sensitive device controls positionally the actuation and stopping of various apparatus controlling the flow of the product in the conduit and of a pump exhausting previously chemically treated and neutralized water from the supply reservoir and injecting it into the interspace. At least one wire is tensioned along the upper surface of the envelope containing the water and terminates in sealed boxes. At least one discharge valve connects the interspace with the outside atmosphere.

---

This application is a continuation of my copending application Ser. No. 492,417 filed Oct. 4, 1965, now abandoned.

The invention relates to a land or underwater pipe line adapted for the transporting or conveying of different products and more particularly to liquid or gaseous hydrocarbons, in which the land pipe line may be on or under the soil.

It is known that leaks in an ordinary oil duct or conduit pollutes soil and water and under ordinary pressures the losses are of the order of 20 to 200 liters per hour. In addition, in submerged pipe lines, whether transporting oil or gases, water penetrates through the fissures into the duct when the pressure is sufficiently low, and attacks the pipe wall and causes the start of the breakdown of the installation and the occurrence of accidents.

It is known to provide oil ducts in which one sector is equipped with a tubular envelope or casing and in which the annular space between the two components is filled with a fluid, preferably a gas, at low pressure. In the case of a crack, for example of the duct or conduit, the annular space would be filled with large quantities of petroleum products which pollute the soil when the envelope in turn breaks. Due to this injection of liquid into the annular space, the interval pressure rises and this change causes, but only when it reaches a certain value, the closure of the valves at the ends of the sector and interrupts the action. In addition to such interruption being very troublesome, the system does not localize the fault, and the location thereof may take considerable time and such a double-jacketed pipe line does not provide a safety pipe line.

An object of the invention is the elimination of these and other drawbacks.

In fact, in the present pipeline, pollution or an internal breakdown cannot occur in spite of cracks and the action can continue without stops. In the case of an underwater pipe line, water will never penetrate through a crack and the localization of a crack can be effected quickly and accurately without any examination along the pipe line. The present pipe line may therefore be regarded as a safety pipe line.

In the case of an underwater pipe, the same is preferably anchored by cable to submerged blocks. The pipe lines are immobilized at any level by cable locking arrangements disclosed in the applicant's earlier British Patents Nos. 904,854 and 990,659. This anchorage at freely selected depths between the bottom of and the surface is advantageous in that it enables methodical maintenance, preferably by lifting the pipe line to the surface level. This maintenance reduces substantially the formation of cracks and in fact even completely eliminates such cracks.

According to the invention, at least a section of the conduit means serving for the transportation of the products is located in a tubular envelope with the space between the conduit means and the tubular envelope being filled with previously chemically treated and neutralized water and connected to a water supply reservoir. An automatic pressure-sensitive means for pressurizing the water relative to the pressure in the conduit means is connected by means affording separate communication with the conduit means and a channel of the interspace. A member integral with the pressure-sensitive means controls positionally the actuation and stopping of various means controlling the flow of the product in the conduit means and of a pump exhausting previously chemically treated and neutralized water from a supply tank and injecting it into the interspace. At least one wire is tensioned along the upper surface of the envelope containing the water and terminates in sealed boxes. At least one discharge valve connects the interspace with the outside atmosphere.

The invention also consists in a pipe line of which at least a section of the conduit is located in a tubular envelope in which the interspace between the conduit and the envelope is filled with the previously chemically treated and neutralized water and a pressure gauge device operably associated with the reservoir issues a warning signal when adjustable upper and lower pressure thresholds are exceeded. At least one wire tensioned in the interspace along the upper surface of the envelope extends into sealed boxes mounted at the ends of the section and at least one discharge valve connects the interspace with the outside atmosphere. The automatic pressure-sensitive device, preferably a differential piston, serves to compress the water to a pressure slightly higher than that of the product being transported. The member integral with this device moves therewith and controls by such movement successively the various apparatus and the pump and the recharging reservoir with water for the interspace. The reservoir has at least one cock which, in the open condition, allows the movement of a certain amount of water either towards the outside or towards the reservoir. A cable, at least partially of a material adapted to be marked by the product, is tensioned longitudinally in the space and means positioned at the outlets of the cable are either permanently or temporarily adapted to reel this cable up and off.

It follows from these features that at least a certain length of the cable is so formed that its periphery reacts with the product and that this reaction results in the periphery being marked.

If the carried product has a density lower than water the cable is tensioned in the uppermost part of the interspace.

In the case of an underwater pipe line, there are also provided suspension, fixing and immobilizing means disclosed in other of the applicant's aforesaid patents.

Chemicals, whether colored or not and preferably different from the chemical product used for the water in the interspace, may be added to the product being transported and the liquid in the interspace.

The tubes of the conduit and envelope may be of any material and need not necessarily be the same. In fact, whatever the product pressure, the conduit is normally subjected to a resulting mechanical stress of a very low order, e.g., 1 kg./cm.$^2$ at the point of the adaptation arrangement, and downstream of which, e.g. at the end of the enveloped section, it may be slightly higher due to the pressure loss in the conduit.

The water in the interspace forms a sheath around the conduit and it may be charged with inhibitors and other agents, especially coloring, isotopic or other markers, and preferably it is chemically treated and neutralized by means known in the art. The exterior of the envelope is protected by conventional methods.

A gaseous fluid in the interspace surrounding the conduit would not be suitable due to the great compressibility of gases and the pressure-sensitive means should be placed at the most suitable topographical point of the pipe line.

As long as there are no cracks, the adaptation to the instantaneous pressure of the products can take place only through the automatic arrangement which does not require a supply of additional water to the installation, and is also fully independent of any source of energy other than the pressure. In particular, the arrangement does not require a motor or other prime mover.

In a preferred embodiment of the invention a differential action piston is the automatic pressure sensitive means and comprises a cylinder divided into two chambers by the piston and through at least one of which a piston rod passes with short channels connecting one chamber with the conduit and the other chamber with the interspace. The relative value of the cross-sections of the piston rod or rods determines the pressure ratio in the two chambers for the definition of the minimum required over pressure in the interspace. The cylinder can also embody a hydraulic relay if it is desired that the movements of the piston should be as small as possible.

In the event of a crack developing in the envelope, water escapes towards the outside and causes no pollution, while the presence of a crack in the conduit means only water can flow in very small amounts through such crack from the interspace into the conduit so that no pollution can occur.

The depression following the loss of water is transmitted in the interspace as a depression at high velocity (about 1 km./sec.) to the chamber of the cylinder connected thereto. The equilibrium of the piston is disturbed and the piston moves, thereby reducing the volume of the water chamber and injecting water under pressure into the interspace, while means connected with the rod control the actuation of a pump for injecting water into the interspace and compensates for the loss. The injection point may be at any location along the pipe line, but is preferably located at one end. Since the conduit never loses oil, the action can continue without regard to the crack. There is no extreme urgency for actuating the pump and during a transitional period replacement water is simply supplied by the automatic adaptation means whose cylinder is naturally sufficiently large.

It should also be noted that even if the pump breaks down no pollution occurs and in such a case, the piston rod goes beyond the normal position controlling the pump and causes a warning to be effected and either an intervention or the automatic closure of the valves.

According to the resultant of weight and thrust, the conduit can be located at the top or bottom of the enveloping wall and to prevent direct contact between the two components, the conduit and envelope may be assembled at certain points of the line by means of rings or other centering devices. In addition, the annular space may also contain longitudinal ribs of a suitable material, for example synthetic resin.

The previously mentioned cable can rest, or be suspended, on these or other devices. At least a certain length of the cable is so formed that its periphery reacts with the product or its natural or added impurities, and this reaction produces a mark on the cable with such reactive part being formed by a metal core and a suitable sheathing. It may be connected to non-reactive segments which may be defined by simple wires or the cable may be homogeneous, i.e. reactive over its entire length or constructed as described, and the ends thereof lead through tight joints where they are fixed to reels for reeling and unreeling respectively, the cable. These reels which may or may not be mobile or motorized are preferably provided with counter means for indicating at any time the length of cable reeled.

The above-mentioned mark may be a chemical, mechanical, optical or electronic effect, namely, a color change, a rupture, a fluorescence, or a radiation, respectively, and the mark is formed on the cable at the point of the crack whereby it is sufficient to reel up the cable until the mark appears to determine the distance between the crack and the reeling up point, or, in other words, to localize the crack. The mark may be detected by direct or indirect observation, and in the latter case, for example under ultraviolet or polarized light or by a Geiger counter.

For the product to react with the cable it is necessary for several liters of the product to enter the interval through the crack and to this end the water is decompressed by opening a purge cock for a few seconds which reverses the pressure relationship.

According to one preferred embodiment of the invention, the previously described arrangement for adapting the pressures, the integral member, the pump and the supply reservoir are omitted. The interspace water, which has been previously treated and neutralized, is introduced at low pressure and the instantaneous pressure depends only on the thermal and mechanical expansion ratio. The interspace is usually at a lower pressure than the conduit so that with a break or rupture in the conduit, oil flows towards the interspace until the pressures are balanced. Since water is incompressible it enters the interspace only in a small amount to re-establish equilibrium. It is sufficient for the transfer of oil to be quite small, and the volume of the interspace to be small, and for this reason, the section may be subdivided, if necessary.

A pressure gauge indicator means operably associated with the reservoir issues a warning signal when the pressure drops or rises beyond variable limits. To prevent such warning from being effected as a consequence of thermal expansion, it may be associated, below a certain adjustable threshold, with the indication of a contact thermometer.

In this embodiment, the other features above mentioned remain unchanged. In particular, the head of the double tube is equipped with grooves adapted to receive channels whereby an over-pressure double tube can at any time be formed and controlled by suitable means.

Additional objects and advantages of the invention will become more readily apparent to persons skilled in the art from the following detailed description and attached drawings, and in which drawings:

FIGURE 1 is a diagrammatic view showing a section of a pipe line provided with an envelope, with the right hand section being in cross-section together with the elements thereof, while the left hand section is in side elevation, FIGURE 2 is a view in cross-section slightly upstream of the junction of a tube $u$ and the envelope with the tube $(u+1)$, FIGURE 3 is a fragmentary view showing the upper portion of a cross-section slightly upstream of the junction of the tube $(u+1)$ of the envelope with the following tube $(u+2)$, and FIGURE 4 is a fragmentary view in cross-section of the head of the section and its juncture with a conventional pipe line.

The product flows along a conduit 1 in the direction shown by the arrows; 1' denotes a conventional pipe line upstream of this section, 2 an envelope and 3 an interspace filled with water under pressure. 4 indicates a part of the junction which forms at 5 a first chamber communicating with the product and at 6 a second chamber communicating with the water in the interspace 3.

A terminal bossing of channel 7 from the chamber 5 provides communication for the product with a chamber 9 of a cylinder 11 constituting an automatic pressure-sensitive device, and bossing of channel 8 from the chamber 6 provides communication between the water in the interspace 3 and a chamber 10 of cylinder 11.

A piston 12 separates the chambers 9 and 10 and its piston rod 13 carries a cam 30 at its free end which can, according to its position, actuate contacts 31, 31', 31", etc. and control thereby the activation or deactivation of a pump 28 or any other suitable device.

A water reservoir 27 is supplied with water at 29 via an electro-magnetic refilling valve and is equipped with level gauges 34 and 34 for issuing a warning at 33 or an alarm at 35.

A channel or conduit 14, equipped with a stop-cock 36, connects the pump 28 with the chamber 10 and the interspace 3, respectively, and 4' denotes the junction section in connection with the conventional pipe line 1' downstream thereof.

Three spacing or centering shoes 23, 24 and 24' are provided for the conduit 1 relative to the envelope 2 and the shoes are connected by springs 25 and 25'. They are retained in position by the conduit 1 resting on the shoes 24 and 24' if its weight is greater than its lift or against the shoe 23 in the opposite situation.

It is to be understood that the shoe 23 is a guide shoe and is provided in its upper part with a groove through which wires or cables 15 and 15' pass. At 26 is shown a shoe or stay in which the groove is in the lower portion, while the upper portion of the shoe forms a barrier for the product, as will be later explained.

The cable or wire tensioned along the water in the interspace 3 over the entire section leaves the same through a pressure reducing tube 16 and enters a box 17 closed by a cover or lid 18. The box 17 is equipped with a decompression valve 19 and the wire 15' is a reserve wire in case the wire 15 is broken.

To permit the expansion of the conduit 1, the same is separated from the conventional pipe line 1' by a certain space, but since it is necessary to provide for the passage of a scraper which must not be obstructed in the first chamber 5, the ends of the conduit 1 and pipe line 1' are equipped with bars or rods 21 and 22 which engage with each other.

The operation is as follows:

The piston 12 stops in a position of equilibrium. If the pressure of the oil in the chamber 9 rises, the piston 12 is moved to the left and assumes a new position of equilibrium, and this continues so that a constant over-pressure is maintained in the interspace 3. The position illustrated in the drawing corresponds to a low oil pressure.

The conduit 1 is only subjected to an insignificant pressure stress which is the sum of the over-pressure caused by the differential piston and the pressure loss. On the other hand, the envelope 2 protects the conduit from outside damage due to vibration, pickaxes, digging, etc., and in addition also prevents corrosion because the water in the interspace 3 has been chemically treated and neutralized. Due to the elimination of these three dangers, a crack is highly improbable.

If this should occur the operation is as follows:

The piston 12 is progressively and gradually displaced to the left and the cam 30 reaches a contact, for example 31, which activates the pump 28 causing it to draw water from the reservoir 27. When the water in the reservoir drops, the gauge 32 effects a warning at 33 and also controls the electro-magnetic refilling valve 29.

If the output of the pump 28 is considerable or the movement of the rod fairly quick, the break is in the envelope 2 and is localized, for example, by following the line with a Geiger counter if the water in the interspace 3 has been doped with isotopes. If the pump outlet is low and the movement slow the break is in the conduit 1.

In order to localize the break, the interspace is decompressed by opening a valve (not shown) and allowing several liters of water to escape into the soil. This reverses the pressure ratio and permits several liters of oil to escape through the crack into the interspace 3. Under gravity, this oil forms a bubble in the dome of the interspace and the wire is impregnated in the oil bubble.

The box 17 is decompressed by opening the valve 19 and this permits the cover 18 to be removed so that the end of the wire 15 may be attached to a take-up reel while the other end of the wire at the other end of the section may be mounted on a pay-out reel. The pressure reducing tube 16 has a very high charge loss, so that only little water escapes through the open box. Moreover, once the cable has been let out, an operating cover with a hole sufficient for receiving the cable may be fitted thereto, so that the loss of the water is further reduced. The length of the cable is reeled up until the mark appears indicating the distance separating the take-up reel from the crack.

For repair, the interspace 3 must first be emptied of water. However, traces of oil can nevertheless subsist and continue to mark the cable. For this reason, only an ordinary wire is tensioned in the interspace and the detector cable is connected thereto only for purposes of locating the fault. The wire 15' acts as a reserve wire in the case of a rupture of the wire 15.

If the pipe line is on a gradient, the oil will, after a short vertical travel to the envelope of the interval, rise along the upper surface thereof. This travel is prevented by the shoe 26 forming a barrier in the upper part. These barrier shoes are arranged, for example, at the start of each even tube during the assembly of the envelope. The space separating the shoes is therefore about 20 meters. This represents the maximum inaccuracy in localizing the fault because if all parts of the section have a slope in the same direction and, for example, a low point of the section is reeled up, the start of the marking localizes the break. The mark is therefore exactly at the point of the fault and the same also applies to a pipe line positioned on the level.

Finally, if the pump 28 does not operate, or if the reservoir does not fill up this will have no ill effects. In the former case, the rod 13 reaches an end cam which effects a warning that the chamber 10 is not empty, and in the second case, the level gauge 32 issues a warning preventing the reservoir from running dry.

The invention is not to be confined to any strict conformity to the showings in the drawings but changes or modifications may be made therein so long as such changes or modifications mark no material departure from the spirit and scope of the appended claims.

What is claimed is:

1. A pipeline including a conduit for the passage of a product to be transported, a tubular envelope, at least a section of the conduit being located in the tubular envelope, an interspace between the conduit and the envelope being filled with previously chemically treated and neutralized water, a water supply reservoir, said interspace being connected to said water supply reservoir, pressure-sensitive means for pressurizing the water relative to the pressure in the conduit connected by means affording separate communication with said conduit and said interspace, a pump for exhausting previously chemically treated and neutralized water from the water supply reservoir and injecting it into the interspace, a member integral with said pressure sensitive means controlling positionally the actuation and stopping of means controlling the flow of the product in the conduit and said pump, at least one wire tensioned along the upper surface of the envelope containing the water, sealed boxes in which said one wire terminates, and at least one discharge valve connecting the interspace with the outside atmosphere.

2. The pipeline as claimed in claim 1 in which the ends of said conduit section and said envelope terminate in a juncture piece joining two chambers and a terminal channel of the conduit section providing communication of one of said two chambers with a first chamber of said pressure-sensitive device and another terminal channel providing communication between the other of said two chambers with a second chamber of said pressure-sensitive device.

3. The pipeline as claimed in claim 2 including at least two successive sections, the terminal of one section being adjacent to the upstream or downstream junction of the other section.

4. The pipeline as claimed in claim 2 in which the channels are plugged by removable plugs.

5. The pipeline as claimed in claim 1 in which a cable connectable to said wire reacts with the transported product whereby such reaction effects a marking on the cable.

6. The pipeline as claimed in claim 5 including reels for the cable located adjacent the sealed boxes.

7. The pipeline as claimed in claim 1 in which the sealing boxes are connected to the interspace by a pressure reducing tube containing the wire and the free space between the wire and the wall of the pressure reducing tube being less than 2 mm.

8. The pipeline as claimed in claim 1 in which spacer shoes are placed along the conduit between the conduit and the envelope, one set of shoes comprising a guide for the wire and another set of shoes forming a barrier for the transported product.

9. The pipeline as claimed in claim 1 in which the transported product in the conduit contains colored or radioactive chemical products.

10. The pipeline as claimed in claim 1 including a thermometer connected with the interspace and means operably connected thereto for causing a warning signal to be operative only below an adjustable temperature level.

11. A pipeline including a conduit for the passage of a product to be transported, a tubular envelope, at least a section of the conduit being located in said tubular envelope, an interspace between the conduit and envelope filled with previously chemically treated and neutralized water, a water supply reservoir connected to said interspace, a pressure gauge means operably associated with the reservoir for issuing a warning signal when adjustable upper and lower pressure thresholds are exceeded, at least one wire tensioned in the interspace along the upper surface of the envelope, sealed boxes at said section into which said wire extends, and at least one discharge valve for connecting the interspace with the outside atmosphere.

12. The pipeline as claimed in claim 11 in which the ends of the conduit section and the ends of adjacent conduits are provided with bars adapted to interengage during expansion or contraction of the conduit due to temperature.

13. The pipeline as claimed in claim 11 in which the water is charged with colored or radioactive chemical products.

References Cited

UNITED STATES PATENTS 3,184,958   5/1965   Eaton _____ 73—40.5

FOREIGN PATENTS 949,200   9/1956   Germany.
1,143,064   1/1963   Germany.

HENRY T. KLINKSIEK, *Primary Examiner.*

U.S. Cl. X.R.

138—94, 148; 137—554, 375